April 7, 1959 P. T. ATTERIDG 2,881,058
SULFURIC ACID PURIFICATION
Filed Oct. 24, 1955 2 Sheets-Sheet 1

INVENTOR.
PAUL T. ATTERIDG
BY
ATTORNEYS

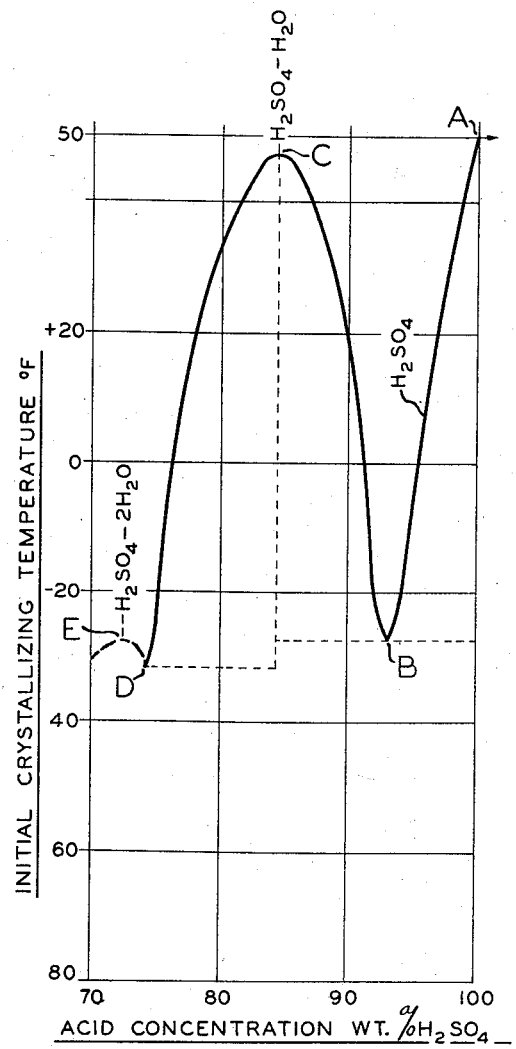

2,881,058
SULFURIC ACID PURIFICATION

Paul T. Atteridg, Little Falls, N.J., assignor to The M. W. Kellogg Company, Jersey City, N.J., a corporation of Delaware Application October 24, 1955, Serial No. 542,242

11 Claims. (Cl. 23—295)

One aspect of this invention relates to an improved method for purifying sulfuric acid. Another aspect of this invention relates to an improved method for purifying sulfuric acid by fractional crystallization. A further aspect of this invention relates to an improved method for producing crystals of a sulfuric acid hydrate.

At present, sulfuric acid is used extensively for various purposes, such as refining of lubricating oils, alkylation of hydrocarbons, dehydrating wet materials, etc. Usually, the acid becomes contaminated with materials of the particular process in which it is used and must be subjected to a purification treatment to restore its purity and/or strength. For example, sulfuric acid which is used as a catalyst for alkylating hydrocarbons should be maintained at a high level of strength and should be reasonably free of certain impurities including both polar and non-polar impurities. Excessive amounts of impurities seriously affect the quality of the alkylate product. Previously, it has been proposed to purify contaminated sulfuric acid by crystallization to produce crystals of sulfuric acid and a mother liquor comprising sulfuric acid and contaminating materials. As will be explained subsequently, water appears to have a greater effect on the concentration of sulfuric acid in the mother liquor than other impurities. Consequently, if water is present in excessive quantities, it is necessary to reduce the water content of the spent acid in order to obtain crystals of sulfuric acid. This can be done by adding an $SO_3$-containing material such as sulfur trioxide or fuming sulfuric acid. The mother liquor formed in the crystallization contains much valuable sulfuric acid which has previously been unrecoverable by any economically feasible process.

It is an object of this invention to provide an improved method for purifying sulphuric acid.

Another object of this invention is to provide an improved process for the removal of substantial amounts of non-polar and/or polar impurities from sulfuric acid by fractional crystallization.

A further object of this invention is to provide an improved process for the purification of sulfuric acid alkylation catalyst.

Another object of my invention is to provide an improved process for the production of a sulfuric acid hydrate.

Another object of my invention is to provide an improved alkylation process.

Another object of my invention is to provide an improved process for the removal of water from a mixture of sulfuric acid and water whether or not the mixture contains other impurities.

Still another object of my invention is to provide an improved process for the removal of organic impurities from sulfuric acid contaminated therewith.

In accordance with one aspect of my invention, an aqueous solution of sulfuric acid contaminated with at least one organic impurity is cooled to a sufficiently low temperature so that a solid phase is formed comprising a sulfuric acid hydrate. The solid phase is substantially free of organic impurities and is recovered as a product of the process. If the contaminated acid does not contain sufficient water for such a solid phase to form, the water content may be regulated prior to cooling to make possible the formation of a solid phase of the desired characteristics.

The contaminated acid treated according to my invention may come from many sources. It may, for instance, be spent sulfuric acid alkylation catalyst. It may also be the mother liquor resulting from the crystallization and separation of pure acid crystals from spent sulfuric acid alkylation catalysts.

The present invention is concerned with purifying sulfuric acid solutions which contain polar and/or non-polar organic impurities, e.g., alkyl sulfates, hydrocarbon polymers etc. For the purposes of this specification and the appended claims, water will be treated as a separate impurity in addition to other impurities. The contaminated sulfuric acid solutions may contain any amount of water and other impurities and still be satisfactory for processing under the present invention. My invention, however, has particular utility as a method for purifying strong acid solutions, particularly solutions containing at least about 80 weight percent of sulfuric acid, preferably about 90% on the same basis. Water may comprise the sole impurity in the acid solution, or the acid may contain at least two impurities and the concentration of each impurity may vary widely in relative proportion to each other. The proportion of sulfuric acid based on water and sulfuric acid only should generally be more than about 85 weight percent.

According to one aspect of my invention, the contaminated aqueous sulfuric acid solution is treated to remove impurities. Impurities except water are substantially removed and water is also removed except for a small amount which may be tolerated in the purified acid. According to this aspect of my invention, crystals of sulfuric acid are formed in a first crystallization zone and water is added to the resulting mother liquor so that crystals of a sulfuric acid hydrate are formed in a second crystallization zone. Crystals from the two crystallization zones are then liquefied and combined to form the desired, purified mixture of sulfuric acid and water. In this way acid solutions containing more than an allowable amount of water and which may or may not be contaminated with other impurities are purified so that the resulting acid solution contains only sulfuric acid and a small amount of water. This type of treatment is particularly well suited for use in treating sulfuric acid used as an alkylation catalyst. Such acid usually contains small amounts of water and becomes contaminated with additional water and other impurities. By the use of my invention, the additional water and any other impurities can be substantially removed, while leaving no more than an allowable amount of water in the purified acid.

When the sulfuric acid solution is subjected to crystallization temperatures, the quality of the crystals formed will depend upon the amount and type of impurities which are present in the original acid solution. The nature of the impurities will affect the concentration of acid in the acid crystals as well as the temperature at which such crystals will form. The type of impurity will also affect the quantity of sulfuric acid remaining in the liquid phase and the temperature at which the crystals form. The amount of impurities also influences the purity of the crystals and the freezing point temperatures at which crystals are formed. Consequently, for any sulfuric acid solution, for given concentrations of impurities, it is found that crystals of sulfuric acid of fixed purity will continue to form as the temperature is decreased until a eutectic point is reached. If the temperature is reduced to below the eutectic point, additional crystals of different composition (i.e., of eutectic composition) form. As the temperature of crystallization is continuously decreased and crystals of a constant purity are formed, there is a continuous change in concentration of acid in the uncrystallized liquid commonly known as mother liquor. In some cases, depending upon the nature of the impurities, there may be more than one eutectic point. This is the case, for example, when dealing with mixtures of sulfuric acid and water. In such cases, it is necessary to insure that the solution being treated in each crystallization zone is within the limits imposed by the eutectic characteristics of the acid solution so that crystals of the desired substances are formed.

Of the impurities usually found in sulfuric acid, water appears to have the greatest effect on the concentration of sulfuric acid in the mother liquor. This characteristic is to be expected since sulfuric acid has a very strong affinity for water. In view of this affinity, my invention can be practiced by regulating the water content of the contaminated or spent acid in order to control the loss of sulfuric acid in the mother liquor. Water content of the sulfuric acid solution can be conveniently regulated by adding water or an $SO_3$-containing material, e.g., sulphur trioxide and/or fuming sulfuric acid depending on whether more or less water is desired. The relative amount of water present is decreased by adding an $SO_3$-containing material and increased by adding water.

Contaminated sulfuric acid to be purified in accordance with this invention usually contains at least about 5.7 pounds of sulfuric acid per pound of water and is usually at least 80% sulfuric acid by weight. It is frequently desired to purify this spent acid to form a highly concentrated solution of sulfuric acid containing no more than about 1 to about 4 percent by weight of water. My invention provides an efficient and economical technique for purifying acid of this type.

According to one aspect of my invention, the water content of the spent acid is first adjusted so that the desired amount of crystals of sulfuric acid is formed in a first crystallization zone. This is conveniently done by the addition of $SO_3$ or an $SO_3$-containing material, e.g., fuming sulfuric acid. The amount of $SO_3$ to be added will depend on the temperature of the first crystallization zone as well as the amount of sulfuric acid crystals desired. Enough $SO_3$ or $SO_3$-containing material should usually be added so that the resulting mixture contains at least 15.7 pounds of sulfuric acid per pound of water. About 1 to about 5 lbs. of $SO_3$ per pound of water are usually added. The first crystallization zone may be operated at any temperature from the eutectic point of the mixture in that zone up to the freezing point of pure sulfuric acid at about 50° F. It has been found that the presence of organic impurities in the crystallization zone tends to lower the eutectic point to below the eutectic point of a mixture of sulfuric acid and water. In general, temperatures of about −35 to about 0° F. are preferred in the first crystallization zone. The use of relatively lower temperatures allows a relatively greater amount of sulfuric acid crystals to separate from a given solution and hence require relatively smaller additions of $SO_3$-containing material to obtain an equivalent amount of sulfuric acid crystals. Simultaneously, however, there may be the adverse effect of increased mother liquor viscosity to lower the crystal purity at these lower temperatures. According to a modification of my invention, this effect can be largely overcome by dispensing fine droplets of acid to be purified into a spacer material, such as an organic liquid, e.g., propane, which serves as a supporting medium. The temperature of the mixture may be maintained at the desired crystallization temperature and consequently, the droplets of acid are crystallized as small particles. The separation of crystals from the organic liquid is preferably conducted by centrifugal separation and the supporting medium may be used to wash impurities from the surfaces of the crystals during the separation period. The separation of crystals from the supporting medium can be effected by other means such as, for example, decantation, filtration, etc., and then the crystals can be washed with a fresh organic liquid, such as propane, for the removal of impurities from the crystals.

It is discovered that at crystallization temperatures the impurities remain substantially in the mother liquor. Usually part of the impurities are adsorbed on the surfaces of the acid crystals and to some extent, are occluded. In some instances, there is a correlation between crystallization temperature and purity of acid crystals. As the temperature is lowered the crystals become less pure. This phenomenon is apparently caused by the impurities undergoing an increase in viscosity with the lowering of the temperature and hence being readily adsorbed on the surfaces of the acid crystals. To counteract this effect the contaminated acid solution may be crystallized in the presence of an organic liquid which does not solidify at crystallization temperatures and is preferably substantially less viscous than the impurities at corresponding temperatures. Furthermore, such organic liquid supporting medium should be chemically inert and substantially immiscible with sulfuric acid and preferably possess the property of unfavorably influencing the adsorption of impurities on the crystal surfaces. The use of a relatively low viscosity, inert, immiscible organic compound or mixtures thereof serves to space the impurities from the acid crystals or such a liquid tends to adversely influence the affinity of the impurities for the crystals. It is preferred that the low viscosity organic liquid should have little or no attraction for the sulfuric acid such as an undesirably high solubility, otherwise a separation of the acid from the low viscosity liquid may need to be effected. Light, paraffinic hydrocarbons, such as propane, butane, isobutane, etc., are generally preferred for use as liquid spacer material. The use of this organic liquid or solvent as a spacer during the crystallization step makes possible the use of lower temperatures of crystallization than would otherwise be possible because of the difficulty in separating crystals from liquor. Generally, the quantity of organic liquid used as a spacer in relation to the sulfuric acid in liquid form is about 1 to about 100 parts of spacer per part of acid on a volumetric basis. The preferred procedure is to dispense the liquid acid in a continuous phase of organic liquid spacing medium in order to provide a condition in which a large amount of spacer is present relative to the liquid acid during the crystallization step. Accordingly for such a procedure, it is preferred to employ about 10 to about 50 parts by volume of organic liquid per part of acid which is present in the crystallization zone.

After crystals of sulfuric acid are separated from the product of the first crystallization zone, the mother liquor is warmed, if necessary, and sufficient water is added to the mother liquor to shift the solution to the other side of the eutectic point so that crystals of $H_2SO_4 \cdot H_2O$ are formed in the second crystallization zone. Enough water should usually be added so that the resulting mixture contains between about 5.7 and about 13.2 pounds of sulfuric acid per pound of water. The exact amount of water to be added depends on the temperature at which the second crystallization zone is operated and the amount of monohydrate crystals desired. Generally, about 0.002 to about 0.2 pounds of water per pound of sulfuric acid are added. The second crystallization zone may be operated at temperatures of about −35 to about 45° F. but temperatures of about 0° F. to about 45° F. more usually about 30° to about 45° F. preferred because of the lower refrigeration requirements at these temperatures. If the temperature of the second crystallization zone is maintained at about 30 to about 45° F. sufficient water should usually be added so that the resulting mixture contains between about 5.7 and about 8.1 pounds of sulfuric acid per pound of water.

A purified mixture of sulfuric acid and an allowable amount of water can be recovered by liquefying and combining crystals of $H_2SO_4$ taken from the first crystallization zone and crystals of $H_2SO_4 \cdot H_2O$ taken from the second crystallization zone.

I have described my invention with reference to situations where it is desired to obtain acid solutions of relatively high $H_2SO_4$ concentration. In such cases it is usually desired to obtain crystals of $H_2SO_4$ in the first crystallization zone and crystals of $H_2SO_4 \cdot H_2O$ in the second crystallization zone. My invention is also applicable to situations where it is desired to obtain crystals of other sulfuric acid hydrates. For example, crystals of $H_2SO_4 \cdot H_2O$ may be formed in the first crystallization zone and crystals of $H_2SO_4 \cdot 2H_2O$ or $H_2SO_4 \cdot 4H_2O$ in the second crystallization zone. A single sulfuric acid hydrate, such as $H_2SO_4 \cdot H_2O$, $H_2SO_4 \cdot 2H_2O$ or $H_2SO_4 \cdot 4H_2O$ can also be produced by appropriate regulation of the water content of the contaminated acid mixture prior to crystallizing in a crystallization zone.

My invention can be practiced under atmospheric, superatmospheric, or subatmospheric pressure conditions.

My invention is particularly well suited for the purification of contaminated sulfuric acid alkylation catalyst. As a result of the alkylation reaction, the sulfuric acid becomes contaminated with mono-alkyl sulfate, di-alkyl sulfate and a relatively high molecular weight polymeric material. In addition, as a result of oxidation of the ester to $SO_2$, water and polymer, and as a result of entrainment of water in the hydrocarbon-feed, the water content of the acid solution increases. The value of the acid as a catalyst is consequently reduced by the presence of the non-polar impurities, e.g., the di-alkyl sulfate and polymer, and the polar impurities, e.g., the mono-alkyl sulfate and water, and it is necessary to decrease the concentration of these impurities in order to avoid any serious effect on the quality of the alkylate product. According to one theory of the isobutaneolefin reaction mechanism, the mono-alkyl sulfate appears to have no adverse effect on the alkylation reaction but rather it appears to be an intermediate material in the production of the alkylate. Water, possibly resulting from entrainment or solution with the hydrocarbon stream entering the alkylation reaction or from polymerization side reactions of the di-alkyl sulfate, serves to dilute the acid solution. These by-products accumulate in the acid, retard its catalytic activity and lower the quality of the alkylate. In commercial practice, when these impurities increase to about 10 to 12%, the catalytic activity of the sulfuric acid is considered too low and it is withdrawn from the reaction zone. If more impurities are allowed to accumulate, olefin polymerization reactions become excessive and the acid deteriorates.

For a better understanding of my invention, reference should be had to the accompanying drawings.

Figure 2 is a liquid-solid phase diagram for a mixture of sulfuric acid and water.

Figure 1:
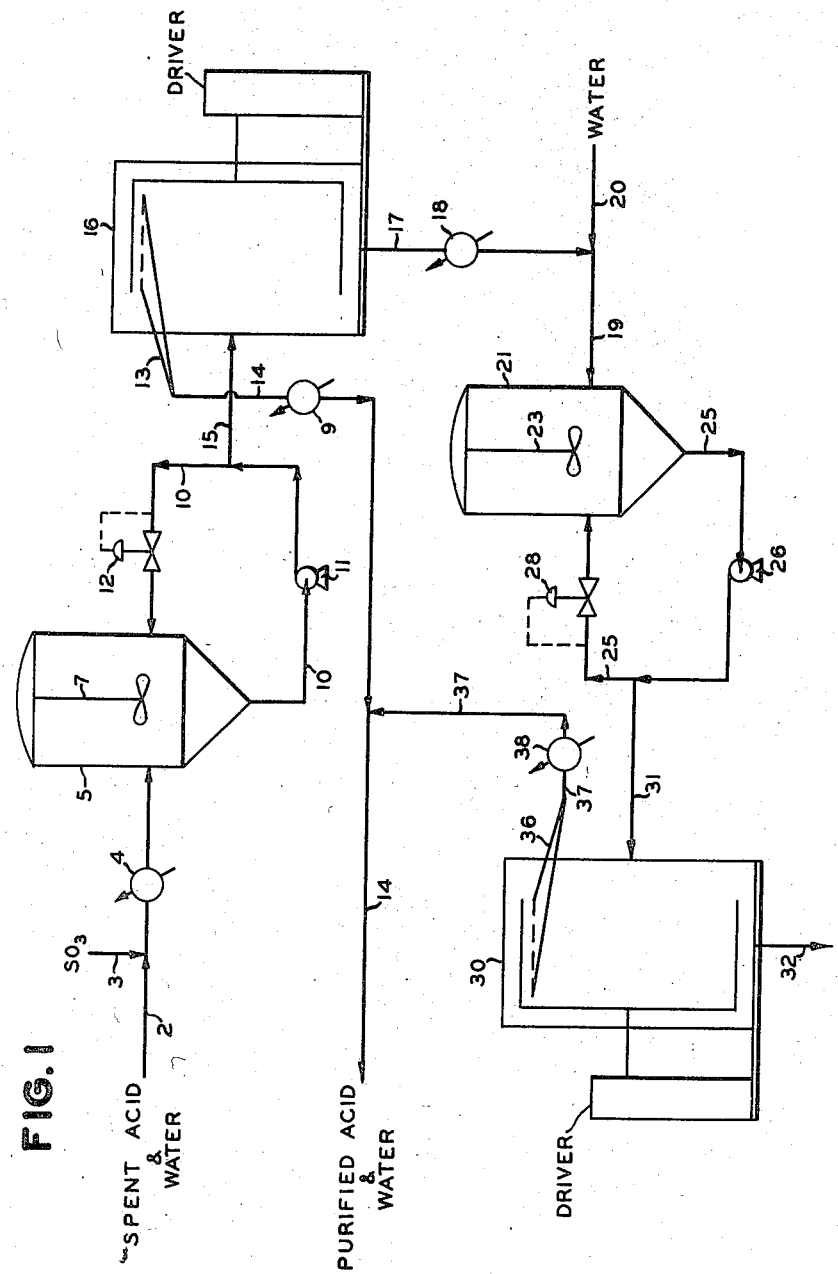
Figure 1 is a diagrammatic drawing in which equipment is shown in elevation and which illustrates a suitable arrangement of apparatus for a preferred embodiment of my invention.

In Figure 1, spent acid from an alkylation process is received through conduit 2. The spent acid contains 95 weight percent of sulfuric acid based on sulfuric acid and water, in addition to other impurities. Sulfur trioxide is added to the spent acid through conduit 3 and chemically combines with part of the free water to form additional sulfuric acid. (The presence of free water in the crystallization zone causes an undesirable quantity of sulfuric acid to remain uncrystallized in the mother liquor; hence, combining the free water with sulfur trioxide or a sulfur trioxide containing material, such as fuming sulfuric acid, improves the yield of acid crystals substantially.)

The fortified spent acid in conduit 2 passes through cooler 4 where it is cooled to near crystallization temperature and is passed into crystallizer 5. In crystallizer 5 the acid solution is agitated by stirrer 7 at a temperature of $-30°$ F., thereby forming crystals of pure $H_2SO_4$. An organic liquid spacer material may be utilized, as explained previously. A slurry of mother liquor and $H_2SO_4$ crystals is withdrawn from crystallizer 5 through conduit 10. By means of pump 11, part of the slurry is recycled to the crystallizer by means of conduit 11 and control valve 12. The recycled crystals are used to seed the spent acid entering the crystallizer through conduit 2 in order to promote the production of $H_2SO_4$ crystals. The portion of the slurry which is not recycled is passed through conduit 15 to a basket-type centrifuge 16. In this centrifuge the acid crystals are retained on a spinning perforated drum. The uncrystallized liquid comprising sulfuric acid, water, mono- and di-esters, polymer and organic spacer material, if used, is forced through the drum by centrifugal force and then withdrawn from the outer case of the machine. A leveling rake rides on the crystal cake for distributing evenly the solids on the drum. When a predetermined cake thickness is reached, the rake arm closes the slurry inlet valve. A time cycle controller then introduces a wash liquid onto the cake for removal of any sorbed impurities on the crystals. The wash liquid flows for a predetermined period followed by further spinning of the drum to insure more complete separation of the liquids. Thereafter a knife rises and pares the cake of crystals from the spinning drum and diverts them to a suitable outlet. A thin layer of crystals does remain in the drum and this can be further washed, before opening the charging valve to repeat the cycle. The washed crystals are discharged from centrifuge 16 by scraper 13 and are passed via conduit 14 to heat exchanger 9 in which the crystals are melted to form liquid sulfuric acid.

Uncrystallized liquid is withdrawn from centrifuge 16 through conduit 17. If an organic spacer material has been used it is separated and withdrawn in a separation zone not shown. The mother liquor withdrawn through conduit 17 is passed through heat exchanger 18 wherein its temperature is raised to just above the temperature maintained in the second crystallization zone. Water is added to the mother liquor through conduit 20 and the solution thus formed is passed to crystallizer 21 through conduit 19. In crystallizer 21 the solution is agitated by stirrer 23 at a temperature of 35° F., thereby forming crystals of $H_2SO_4 \cdot H_2O$. A slurry of the crystals thus formed and mother liquor is withdrawn from crystallizer 21 through conduit 25 and pump 26. A portion of this slurry is recycled to the crystallizer through conduit 27 and control valve 28. The remainder of the slurry is passed to centrifuge 30 through line 31. Uncrystallized liquid is withdrawn from the centrifuge through line 32. Crystals of $H_2SO_4 \cdot H_2O$ are withdrawn from centrifuge 30 by scraper 36 and are passed via conduit 37 to heat exchanger 38 where they are melted to form liquid $H_2SO_4 \cdot H_2O$. The liquid thus formed is combined with the liquid sulfuric acid in conduit 14 to form a purified mixture of sulfuric acid and water which can then be returned to the alkylation process through conduit 14.

In Figure 2, points B and D are eutectic points and point C is a congruent point. Point A represents the melting point of pure sulfuric acid at about 50° F. If a liquid mixture of $H_2SO_4$ and water having an acid concentration between points B and A is cooled, crystals of $H_2SO_4$ will form when the temperature is lowered to the curve AB. As the temperature is lowered further, additional $H_2SO_4$ will solidify and the composition of the remaining mother liquor will move to the left along curve AB until eutectic point B is reached. If the mixture is cooled further, solids of composition B will be formed. Similarly, if a liquid mixture having a composition between points B and D is cooled, crystals of $H_2SO_4 \cdot H_2O$ will form when curve BCD is reached and $H_2SO_4 \cdot H_2O$ will continue to form as the mixture is cooled further along curve BC or curve CD until eutectic point B or eutectic point D is reached.

It can be seen from Figure 2 that the composition of the liquid mixture determines whether crystals of $H_2SO_4$ or crystals of an $H_2SO_4$ hydrate will form when the mixture is cooled to a crystallization temperature.

For instance, crystals of $H_2SO_4$ will be formed if a mixture of more than about 14.4 pounds of $H_2SO_4$ per pound of water is cooled sufficiently, whereas crystals of a sulfuric acid hydrate will be formed if the mixture contains less than about 14.4 pounds of $H_2SO_4$ per pound of water prior to cooling. Mixtures containing between about 3 and about 14.4 pounds of sulfuric acid per pound of water will produce crystals of $H_2SO_4 \cdot H_2O$ if cooled sufficiently.

According to one aspect of my invention, sulfuric acid contaminated with non-polar impurities and having an acid concentration between points A and B is purified by adding sufficient water so that the composition of the mixture is shifted to between points B and D and then cooling to produce crystals of purified $H_2SO_4 \cdot H_2O$.

When my invention is applied to the process illustrated in Figure 1, the spent acid is contaminated with both polar and non-polar impurities and is of a composition corresponding to the lower portion of curve AB. In order to increase the yield of $H_2SO_4$ crystals, $SO_3$ is added. The $SO_3$ combines with water to form $H_2SO_4$ and the result is to shift the composition of the mixture to a point corresponding to a point further up the curve AB and make possible the recovery of a greater quantity of crystals of $H_2SO_4$ before the eutectic point B is reached. The mother liquor from this first crystallization contains valuable $H_2SO_4$ the recovery of which is not economically feasible by ordinary means. By means of my invention a substantial quantity of this $H_2SO_4$ is recovered in the form of $H_2SO_4 \cdot H_2O$. This is accomplished by adding sufficient water to the mother liquor to shift its composition from a point corresponding to the lower part of curve AB to a point corresponding to the curve BC and cooling to produce crystals of $H_2SO_4 \cdot H_2O$. The crystals of $H_2SO_4 \cdot H_2O$ can then be combined with the crystals of $H_2SO_4$ to obtain an acid of suitable concentration for use as an alkylation catalyst. In this example it is not desired to produce any $H_2SO_4 \cdot H_2O$ in excess of that needed to form, with the crystals of $H_2SO_4$, an acid of the desired concentration and hence the second crystallization zone may be operated at temperatures corresponding to the upper part of curve BC with consequent savings of cooling duty over what would be required if the lower portion of curve BC were utilized.

Reference should be had to Table I for specific examples of the use of my process. Table I shows examples of the usefulness of my invention in the purification of sulfuric acid which has been contaminated with organic impurities and/or additional water. The amounts of $SO_3$ required for conventional single-stage crystallization are also shown by way of comparison. All figures in Table I are based on 100 pounds of fresh acid and water solution and also on the assumption that it is not desired to produce any excess acid. The last two columns of Table I show the economic advantage of my invention due to savings in the amount of $SO_3$ required for acid purification.

TABLE I

*Based on 100 lbs. of sulfuric acid and water mixture*

| Example number | Percent $H_2SO_4$ in fresh acid | Percent $H_2SO_4$ in spent acid | $SO_3$ added, lb. | $H_2O$ added, lb. | Temperature 1st crystallization zone, ° F. | Temperature 2nd crystallization zone, ° F. | Lb. $H_2SO_4$/lb. $H_2O$ in 1st crystallization zone (entrance) | Lb. $H_2SO_4$/lb. $H_2O$ in 2nd crystallization zone (entrance) | $SO_3$ Required for single stage crystallization | Percent $SO_3$ saved by this process |
|---|---|---|---|---|---|---|---|---|---|---|
| 1 | 97 | 85 | 52.5 | 6.5 | −30 | 35 | 32.2 | 6.9 | 56.0 | 6 |
| 2 | 97 | 85 | 52.5 | 1.5 | −30 | −30 | 32.2 | 12.0 | 56.0 | 6 |
| 3 | 97 | 95 | 13.2 | 3.6 | −30 | 35 | 56.5 | 5.8 | 16.8 | 21 |
| 4 | 97 | 97 | 6.6 | 2.5 | −30 | 35 | 70.0 | 6.1 | 9.7 | 32 |
| 5 | 94 | 94 | 12.8 | 5.0 | −30 | 35 | 35.4 | 6.0 | 20.0 | 36 |
| 6 | 90 | 90 | 21.8 | 8.5 | −30 | 35 | 22.9 | 6.1 | 32.2 | 32 |

I claim:

1. A process for the purification of an aqueous solution of sulfuric acid containing an organic impurity which comprises maintaining said solution in a first crystallization zone at a temperature between the eutectic point of said solution and about 50° F. to form crystals of sulfuric acid and a mother liquor, separating crystals from mother liquor, passing said mother liquor to a second crystallization zone, introducing water into said second crystallization zone and maintaining said mother liquor in the presence of sufficient water at a temperature between about −35° F. and about 45° F. so that crystals of a sulfuric acid hydrate are formed, and recovering said crystals as a product of the process.

2. A process for the purification of an aqueous solution of sulfuric acid containing an organic impurity which comprises maintaining said solution in a first crystallization zone at a temperature between about −35° F. and about 0° F. to form crystals of sulfuric acid and a mother liquor, separating crystals from mother liquor, passing said mother liquor to a second crystallization zone, introducing water into said second crystallization zone and maintaining said mother liquor in the presence of sufficient water at a temperature between about −35° F. and about 45° F. so that crystals of a sulfuric acid hydrate are formed, and recovering said crystals as a product of the process.

3. A process for the purification of an aqueous solution of sulfuric acid containing an organic impurity which comprises maintaining said solution in a first crystallization zone at a temperature between the eutectic point of said solution and about 50° F. to form crystals of sulfuric acid and a mother liquor, separating crystals from mother liquor, passing said mother liquor to a second crystallization zone, introducing water into said second crystallization zone and maintaining said mother liquor in the presence of sufficient water at a temperature between about 0° F. and about 45° F. so that crystals of a sulfuric acid hydrate are formed, and recovering said crystals as a product of the process.

4. A process for the purification of an aqueous solution of sulfuric acid containing an organic impurity which comprises maintaining said solution in a first crystallization zone at a temperature between the eutectic point of said solution and about 50° F. to form crystals of sulfuric acid and a mother liquor, separating crystals from mother liquor, passing said mother liquor to a second crystallization zone, introducing water into said second crystallization zone and maintaining said mother liquor in the presence of sufficient water at a temperature between about 30° F. and about 45° F. so that crystals of a sulfuric acid hydrate are formed, and recovering said crystals as a product of the process.

5. A process for the purification of an aqueous solution of sulfuric acid containing an organic impurity which comprises maintaining said solution in a first crystallization zone at a temperature between about −35° F. and about 0° F. to form crystals of sulfuric acid and a mother liquor, separating crystals from mother liquor, passing said mother liquor to a second crystallization zone introducing water into said second crystallization zone and maintaining said mother liquor in the presence of sufficient water at a temperature between about 0° F. and about 45° F. so that crystals of a sulfuric acid hydrate are formed, and recovering said crystals as a product of the process.

6. A process for the purification of an aqueous solution of sulfuric acid containing an organic impurity which comprises maintaining said solution in a first crystallization zone at a temperature between about −35° F. and about 0° F. to form crystals of sulfuric acid and a mother liquor, separating crystals from mother liquor, passing said mother liquor to a second crystallization zone, introducing water into said second crystallization zone and maintaining said mother liquor in the presence of sufficient water at a temperature between about 30° F. and about 45° F. so that crystals of a sulfuric acid hydrate are formed, and recovering said crystals as a product of the process.

7. A process for the purification of an aqueous solution of sulfuric acid containing an organic impurity obtained from an alkylation process which comprises maintaining said solution in a first crystallization zone at a temperature between the eutectic point of said solution and about 50° F. to form crystals of sulfuric acid and a mother liquor, separating crystals from mother liquor, passing said mother liquor to a second crystallization zone, introducing water into said second crystallization zone and maintaining said mother liquor in the presence of sufficient water at a temperature between about −35° F. and about 45° F. so that crystals of a sulfuric acid hydrate are formed, and recovering said crystals as a product of the process.

8. A process for the purification of an aqueous solution of sulfuric acid containing an organic impurity obtained from an alkylation process which comprises maintaining said solution in a first crystallization zone at a temperature between about −35° F. and about 0° F. to form crystals of sulfuric acid and a mother liquor, separating crystals from mother liquor, passing said mother liquor to a second crystallization zone, introducing water into said second crystallization zone and maintaining said mother liquor in the presence of sufficient water at a temperature between about −35° and about 45° F. so that crystals of a sulfuric acid hydrate are formed, and recovering said crystals as a product of the process.

9. A process for the purification of an aqueous solution of sulfuric acid containing an organic impurity which comprises maintaining said solution in a first crystallization zone in the presence of an $SO_3$-containing material at a temperature between the eutectic point of said solution and about 50° F. to form crystals of sulfuric acid and a mother liquor, separating crystals from mother liquor, passing said mother liquor to a second crystallization zone, introducing water into said second crystallization zone and maintaining said mother liquor in the presence of sufficient water at a temperature between about −35° F. and about 45° F. so that crystals of a sulfuric acid hydrate are formed, and recovering said crystals as a product of the process.

10. A process for the purification of an aqueous solution of sulfuric acid containing an organic impurity which comprises maintaining said solution in a first crystallization zone in the presence of an $SO_3$-containing material at a temperature between about −35° F. and about 0° F. to form crystals of sulfuric acid and a mother liquor, separating crystals from mother liquor, passing said mother liquor to a second crystallization zone, introducing water into said second crystallization zone and maintaining said mother liquor in the presence of sufficient water at a temperature between about −35° F. and about 45° F. so that crystals of a sulfuric acid hydrate are formed, and recovering said crystals as a product of the process.

11. A process for the purification of an aqueous solution of sulfuric acid containing an organic impurity which comprises maintaining said solution in a first crystallization zone at a temperature between the eutectic point of said solution and about 50° F. to form crystals of sulfuric acid and a mother liquor, separating crystals from mother liquor, passing said mother liquor to a second crystallization zone, introducing water into said second crystallization zone and maintaining said mother liquor in the presence of sufficient water at a temperature between about −35° F. and about 45° F. so that crystals of a sulfuric acid hydrate are formed, and recovering a purified mixture of sulfuric acid and water by liquefying and combining crystals from each of said crystallization zones.

References Cited in the file of this patent

UNITED STATES PATENTS

| | | |
|---|---|---|
| 2,593,128 | Felter | Apr. 15, 1952 |
| 2,716,592 | Skelly et al. | Aug. 30, 1955 |

FOREIGN PATENTS

| | | |
|---|---|---|
| 96 | Great Britain | Jan. 8, 1883 |

OTHER REFERENCES

Parkes: Concentration of Sulfuric Acid, pp. 43–44, 1924, Van Nostrand Co., New York, N.Y.

Yost and Russell: Systematic Inorganic Chemistry, pp. 336–338, Prentice-Hall Inc., 1944.